United States Patent [19]

Macken et al.

[11] Patent Number: 5,740,298

[45] Date of Patent: Apr. 14, 1998

[54] OPTICAL FIBRE ORGANIZER

[75] Inventors: Luk Jozef Macken, Antwerp; Daniel Daems, Berchem; Pieter De Coster, Linden; Lodewijk Cordula Michael Van Noten, Louvain, all of Belgium

[73] Assignee: N.V. Raychem S.A., Kessel-lo, Belgium

[21] Appl. No.: 605,211

[22] PCT Filed: Sep. 2, 1994

[86] PCT No.: PCT/GB94/01913

§ 371 Date: Mar. 6, 1996

§ 102(e) Date: Mar. 6, 1996

[87] PCT Pub. No.: WO95/07480

PCT Pub. Date: Mar. 16, 1995

[30] Foreign Application Priority Data

Sep. 8, 1993 [GB] United Kingdom ............ 9318633

[51] Int. Cl.⁶ ............................................. G02B 6/36
[52] U.S. Cl. ............................................. 385/135
[58] Field of Search ............................. 385/134–137

[56] References Cited

U.S. PATENT DOCUMENTS

| | | | |
|---|---|---|---|
| 4,148,559 | 4/1979 | Gauthier | 385/55 |
| 4,373,776 | 2/1983 | Purdy | 385/135 |
| 4,489,830 | 12/1984 | Charlebois et al. | 385/135 |
| 4,496,215 | 1/1985 | Shaheen et al. | 385/114 |
| 4,900,123 | 2/1990 | Barlow et al. | 385/135 X |
| 5,067,784 | 11/1991 | Debortoli et al. | 385/135 X |
| 5,237,640 | 8/1993 | Pedraza et al. | 385/136 |
| 5,241,617 | 8/1993 | Peacock et al. | 385/135 |
| 5,428,705 | 6/1995 | Hermsen et al. | 385/135 |
| 5,442,725 | 8/1995 | Peng | 385/135 |
| 5,469,526 | 11/1995 | Rawlings | 385/135 |
| 5,511,144 | 4/1996 | Hawkins et al. | 385/135 |

FOREIGN PATENT DOCUMENTS

| | | |
|---|---|---|
| 0116481 | 8/1984 | European Pat. Off. . |
| 0 490 644 A1 | 6/1992 | European Pat. Off. .......... G02B 6/44 |
| 2846951 | 4/1980 | Germany . |
| 4007405 | 9/1991 | Germany . |
| WO 9118311 | 11/1991 | WIPO . |

*Primary Examiner*—John D. Lee
*Attorney, Agent, or Firm*—Herbert G. Burkard

[57] ABSTRACT

A base for an optical fibre organizer, which comprises: a first passage along one longitudinal edge portion for incoming fibres; a second pasage along an opposite longitudinal edge portion for outgoing fibres; a plurality of first fibre guides separated from one another along the length of the base and extending from the first passage across the base towards the second passage where fibre in said guides are directed away from the plane of the base; a plurality of second fibre guides separated from one another along the length of the base and extending from the second passage across the base towards the first passage where fibres in said guides are directed away from the plane of the base.

21 Claims, 10 Drawing Sheets

OPTICAL FIBRE ORGANIZER

BACKGROUND OF THE INVENTION

The present invention relates to various components for use in an optical fibre network, in particular to components for fibre routing and to modules to be installed with optical fibres.

Optical fibre networks can have a complex architecture involving precise fibre routing and storage between fibre splices and fibre splitters etc. Since splicing and splitting of optical fibres is a complex and lengthy process requiring clean conditions, carrying it out in the field can add considerably to the cost and time for installation of an optical fibre network.

A further problem is that many optical fibre networks have many different points at which fibre organization is required. For example, fibres must be terminated at an exchange, terminated at subscribers, spliced between lengths of optical fibre cable, spliced at spur points from ring networks etc., and splitting must be carried out since each fibre from an exchange carries information for many subscribers.

If organizers and other components were to be tailor-made for each of these points of use their cost would be high. We have therefore designed an essentially modular system, particularly allowing pre-installation or fibres thereby reducing installation work that must be carried out in the field.

We have designed a base which can route fibres from incoming and outgoing cables, and an organizer module which can be removably attached to it.

SUMMARY OF THE INVENTION

Thus, the present invention provides a base for an optical fibre organizer, which comprises:

a first passage along one longitudinal edge portion for incoming fibres;

a second passage along an opposite longitudinal edge portion for outgoing fibres;

a plurality of first fibre guides separated from one another along the length of the base and extending from the first passage across the base towards the second passage where fibres in said guides are directed away from the plane of the base; and a plurality of second fibre guides separated from one another along the length of the base and extending from the second passage across the base towards the first passage where fibres in said guides are directed away from the plane of the base.

The invention also provides an optical fibre organizer module which comprises:

(1) a plate;

(2) means overlying the plate for location of a plurality of optical fibre organizer trays separated from one another along the length of the plate;

(3) a plurality of organizer trays located by means (2); and (4) guides running between plate (1) and the means (2) that can direct fibres from one side portion of the plate at one longitudinal position corresponding to one organizer tray to any of a plurality of longitudinal positions corresponding to those of other organizer trays at an opposite side portion of the base.

The invention further provides a module pre-installed with optical fibres capable of connection between an incoming fibre and a plurality of outgoing fibres, which comprises:

(1) an input organizer tray;

(2) a splitter organizer tray;

(3) a splitter located in the splitter tray;

(4) a plurality of output organizer trays;

(5) a fibre pre-installed between the input tray and the input to the splitter; and (6) fibres pre-installed between the output of the splitter and the output trays.

Each guide of the base preferably terminates in a ramp having a minimum bend radius at least equal to the critical bend radius of the fibre, and those guides are preferably mutually interdigitated and preferably defined by walls that separate the first guides from the second guides.

The fibres directed by the first and second guides away from the plane of the base will in general be received by optical fibre organizer trays that are positioned above the base. Since it may be desirable that any given tray be able to receive a fibre from either side of the base and since each tray will not in general be individually moveable to achieve this, we prefer that pairs of first and second guides terminate at substantially equal distances along the length of the base. This can be achieved if the first guides curve along the base towards one end thereof, or if the first guides curve along the base towards one end and the second guides curve along the base towards the opposite end, such that pairs of first and second guides direct fibres away from the plane of the base at substantially equal distances along the length of the base.

In order that incoming fibres initially extending parallel to the length of the base are not excessively bent, we prefer that the first and second guides curve into the first and second passages respectively at a minimum bend radius at least equal to the critical bend radius of the fibre. The fibres will usually be provided within fibre tubes which preferably terminate at an end or other portion of the first and second passages, optionally at those curved portions. The first and second guides may have means for retaining such fibre tubes, which means preferably comprise protrusions in the guides or other means for ensuring an interference fit.

The base preferably additionally comprises a plate (which will generally be substantially in sheet form, but may comprise a grid) that can overlie the guides thereby preventing lateral displacement of fibres from the guides but allowing longitudinal movement of fibres into or out of the guides. In this way, the plate can be installed and fibres subsequently inserted into the guides. If the plate does not overlie the extreme ends of the guides fibre tube can be inserted into those extreme ends by internal press fit, rather than by longitudinal sliding. The plate can preferably be removably attached to the base for example by a snap-fitting achieved for example by a series of detents protruding from the base engaging with holes in the plate.

The plate preferably has passages therein, preferably holes therethrough, through which can pass fibres that are directed away from the plane of the base by the first and second guides. These passages or holes preferably have a minimum radius of curvature at least equal to the critical bend radius of the fibres and preferably curved upwardly from the plane of the plate.

The plate, or other part of the base, preferably has means for location of one or more optical fibre organizer trays. Such means for location preferably allows a plurality of trays to be pivotally secured adjacent one another on top of the plate. The means for location is preferably bonded or otherwise semi-permanently or permanently secured to the top of the plate. It is envisaged that the plate together with the means for location and the trays will be preassembled in the factory, together with optical fibres connecting a splitter on one plate to a series of other plates, thus forming an organizer module. This module can then be snap-fitted onto the base in the field thereby saving field installation time.

BRIEF DESCRIPTION OF THE DRAWINGS

Fibre routing between the various trays may be provided in any suitable way, but we prefer that the base have third guides that can direct fibres at one side portion of the base at one longitudinal position to any of a plurality of longitudinal positions at an opposite side portion of the base. These third guides are preferably provided by the plate and/or by a means for location of the trays.

The invention is further illustrated with respect to the accompanying drawings, in which.

DESCRIPTION OF THE PREFERRED EMBODIMENTS

Figure 1:
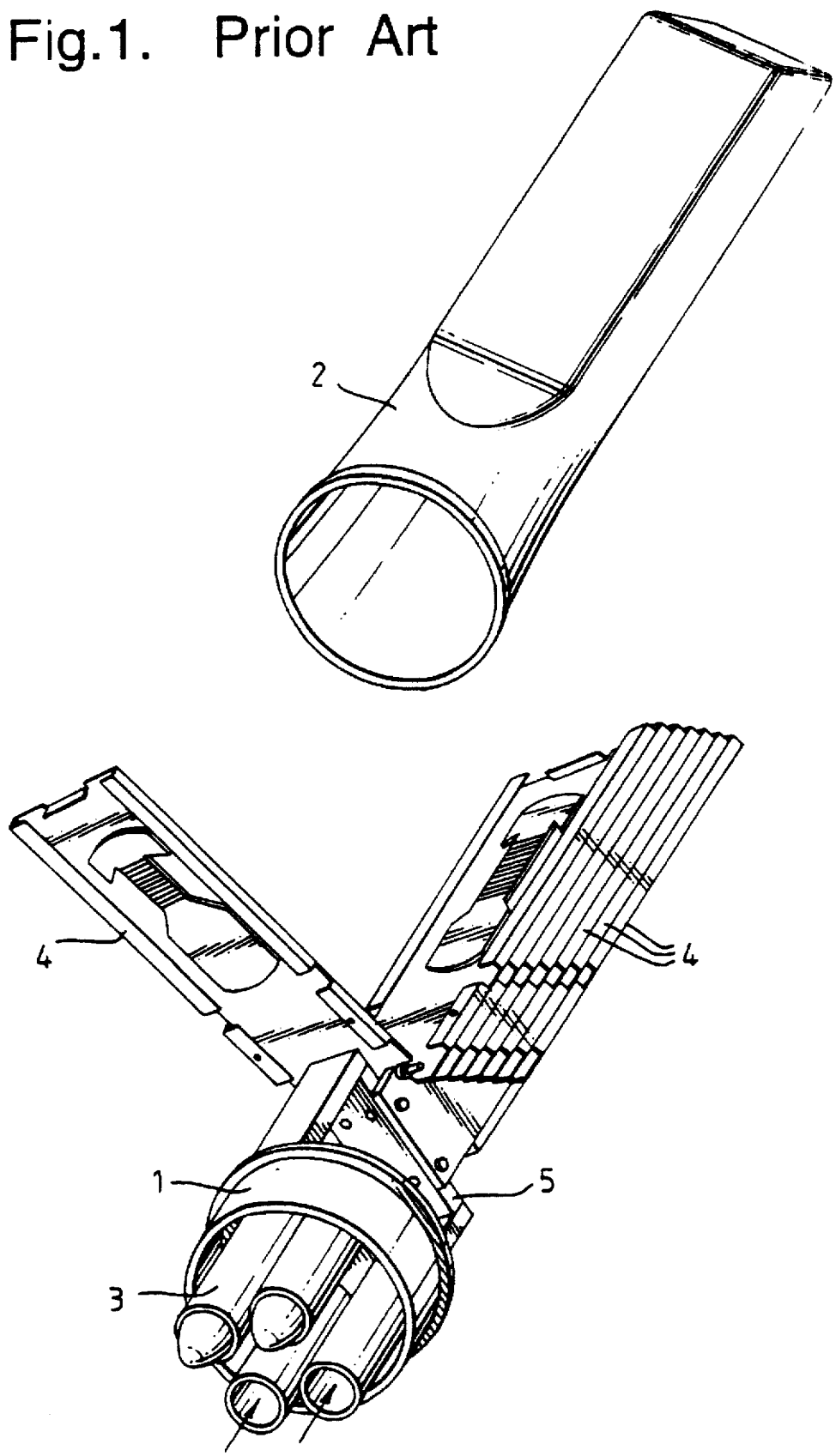
FIGS. 1 and 2 show prior art optical fibre organizers.

FIG. 1 shows a prior art optical fibre organizer as disclosed in EP 0159857 (Raychem). It comprises a base 1 and dome-shaped cover 2, the base carrying various inlets 3 for optical fibre cables on one side thereof and organizer trays 4 attached to a support 5 at the other side thereof. The design as illustrated allows little possibility for choice of fibre routing and little possibility for pre-installation of fibres.

Figure 2:
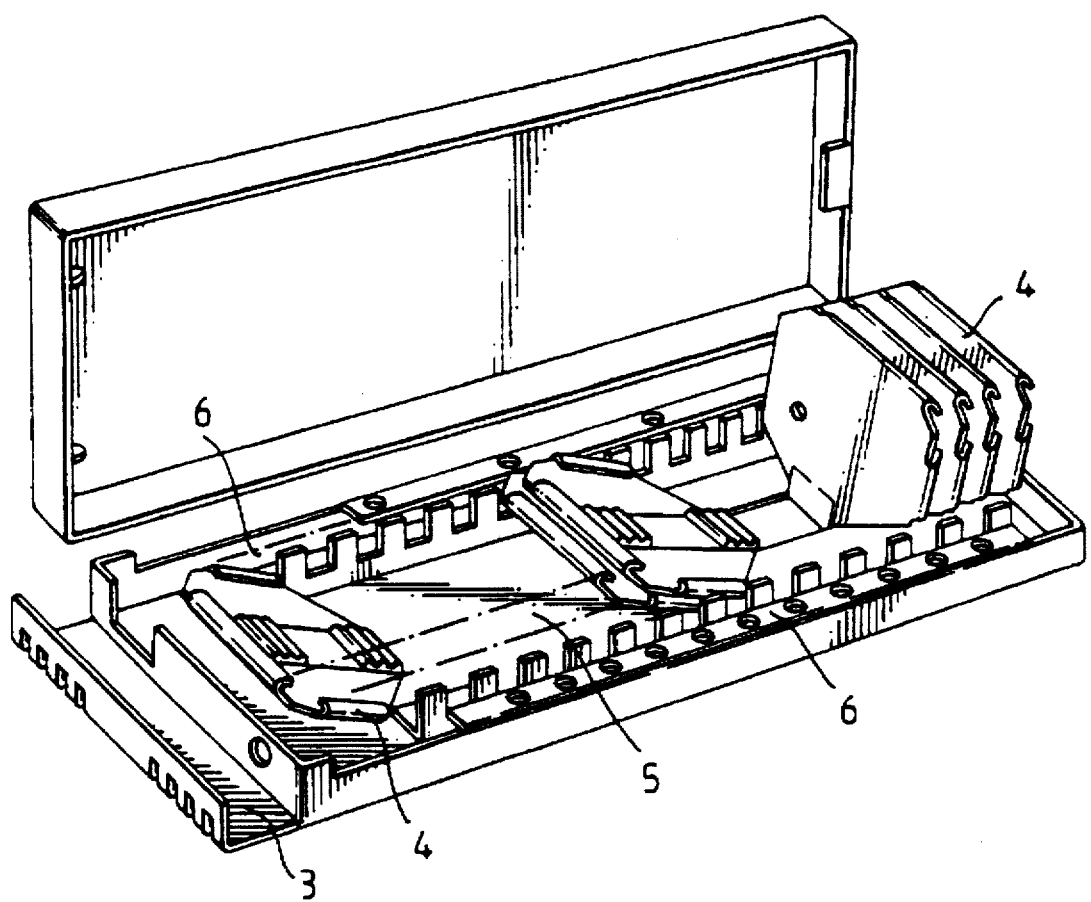

The design of FIG. 2, disclosed in U.S. Pat. No. 4,373,776 (Northern Telecom Limited), has similar disadvantages. This design has a series of optical fibre organizer trays 4 mounted on a base 5 within a box. An inlet port 3 is provided at one end of the box that can lead to longitudinal passages 6 along which fibres can run to the trays 4. Splices between incoming and outgoing fibres are secured to the trays. There appears to be no specific provision for bend radius control nor any provision for passage of fibres across the width of the organizer.

Figure 3A:
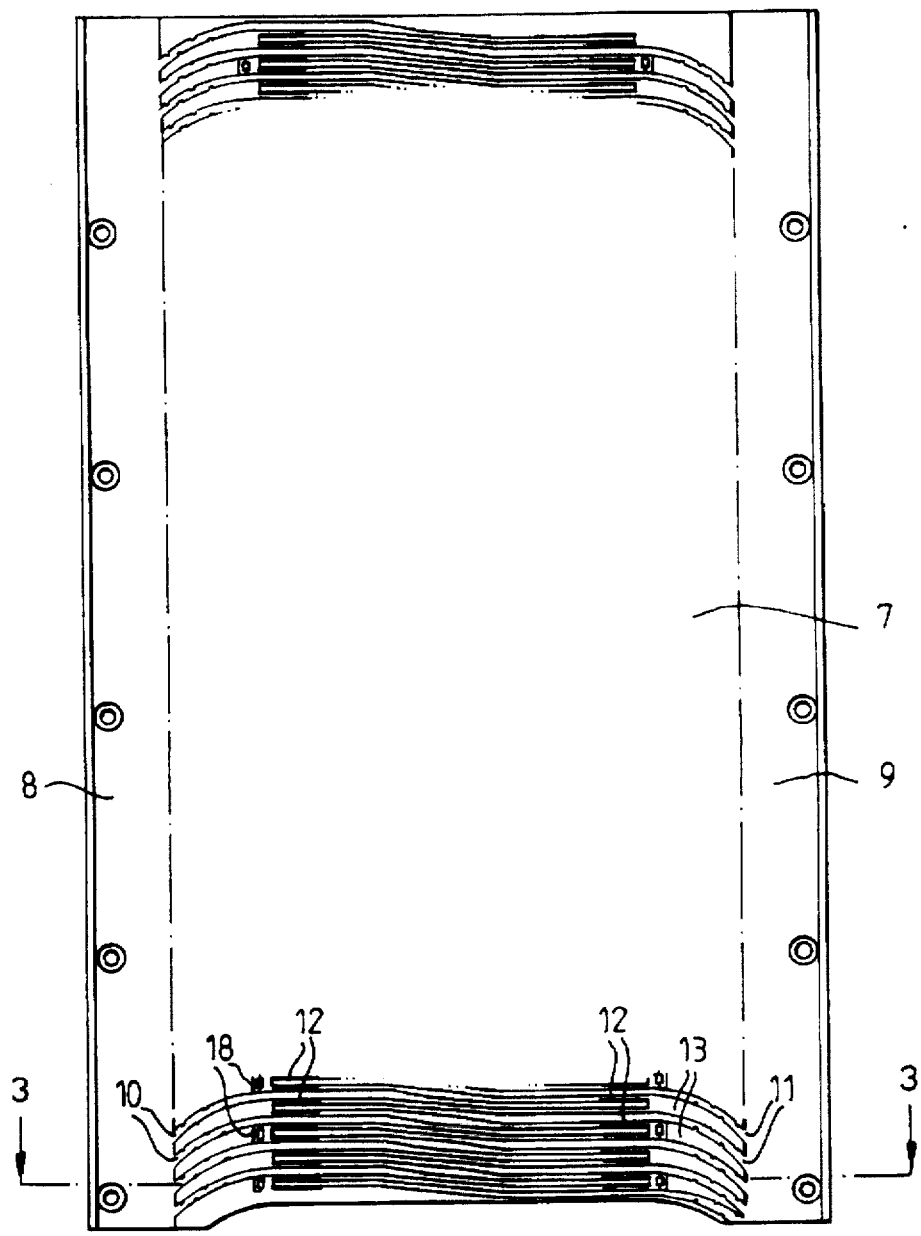
FIGS. 3A to C show a base for an optical fibre organizer.
Figure 3B:
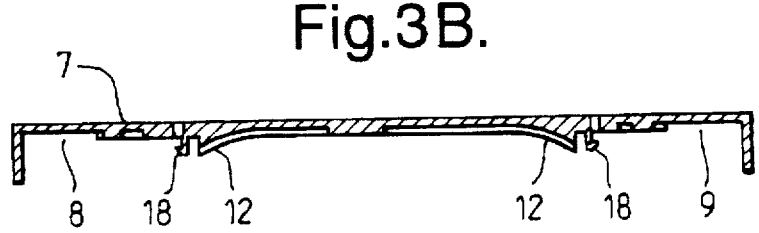
Figure 3C:
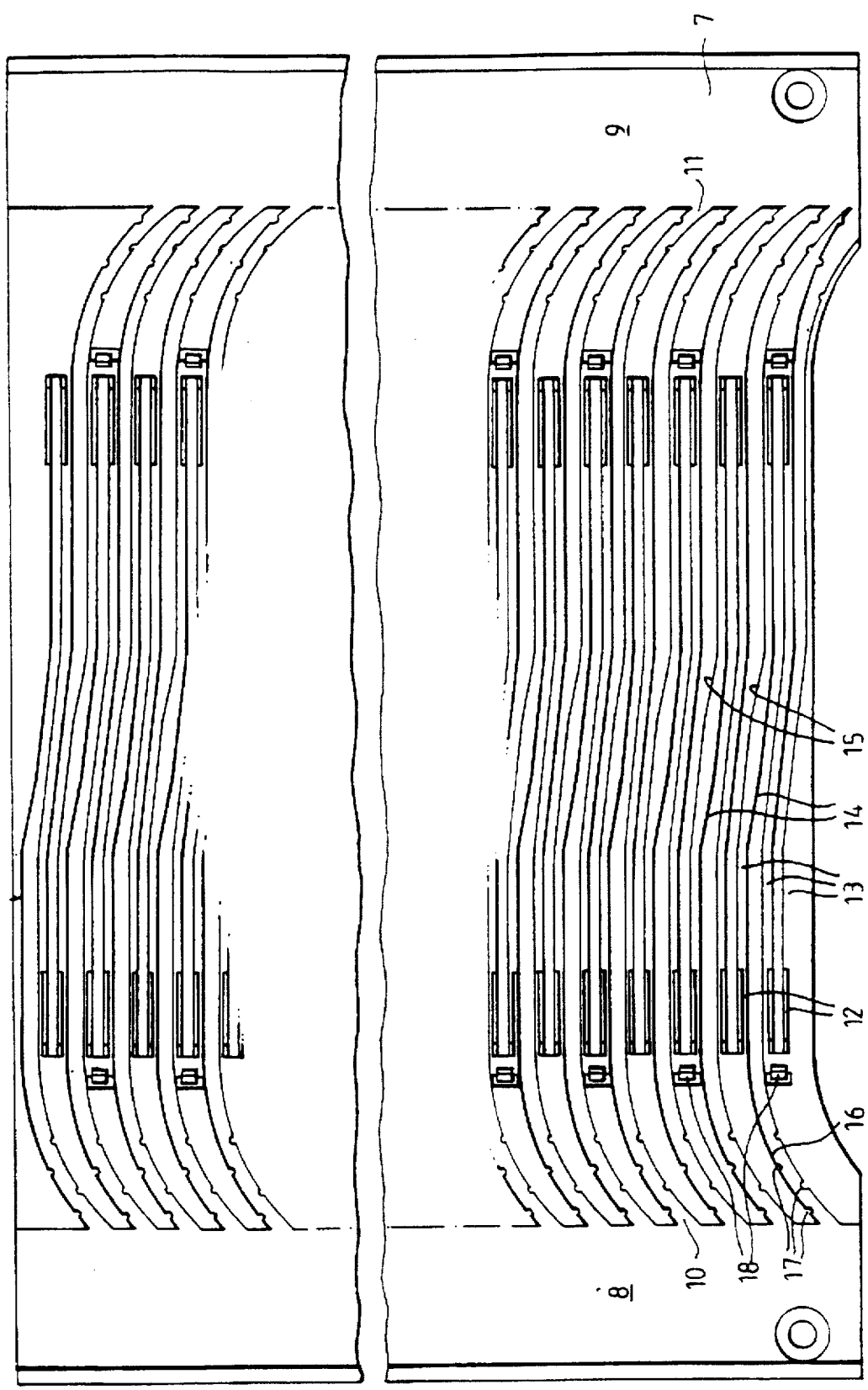

FIGS. 3A, 3B and 3C show a base 7 of the invention. The base 7 has a first passage 8 along one longitudinal edge portion for incoming fibres, and a second passage 9 along an opposite longitudinal edge portion for outgoing fibres. The designations incoming and outgoing are arbitrary and are not intended to indicate direction of light.

Several of first fibre guides 10 are shown separated from one another along the length of the base and extending from the first passage 8 across the base toward the second passage 9. Similarly several second fibre guides 11 can be seen separated from one another along the length of the base and extending from the second passage 9 across the base towards the first passage 8. Only a few of these guides are shown in FIG. 3A, and they can be seen in greater detail in FIG. 3C. FIG. 3B is a cross-section taken line AA of FIG. 3A so the transverse guides can only be partially seen in that figure.

The first and second guides 10, 11 direct fibres they contain away from the plane of the base, and this may be achieved by the provision of small ramps 12 of the correct minimum bend radius.

The first and second guides 10, 11, can be seen to be mutually interdigitated and defined by walls 13 that separate the first guides 10 from the second guides 11. Each guide curves along the base, approximately at positions 14, 15, towards opposite ends of the base (taking into account the direction in which fibres are inserted into the guides from the passages 8, 9). As a result, pairs of ramps 12 are positioned such that the first and second guides 10, 11 direct fibres away from the plane of the base at substantially equal distances along the length of the base.

In order that fibres leaving the passages 8,9 and entering the guides 10,11 do not bend excessively, the guides curve into the passages as shown at 16. These curved portions 16 can be seen to have protrusions 17 that aid interference fit of fibre tubes within the guides. The guides can be seen to become thinner at a position approximately half-way along their length and fibre tubes may terminate anywhere along this thicker portion allowing the fibres they contain to continue along the guides up the ramps and into organizer trays mounted above the base.

Figure 4:
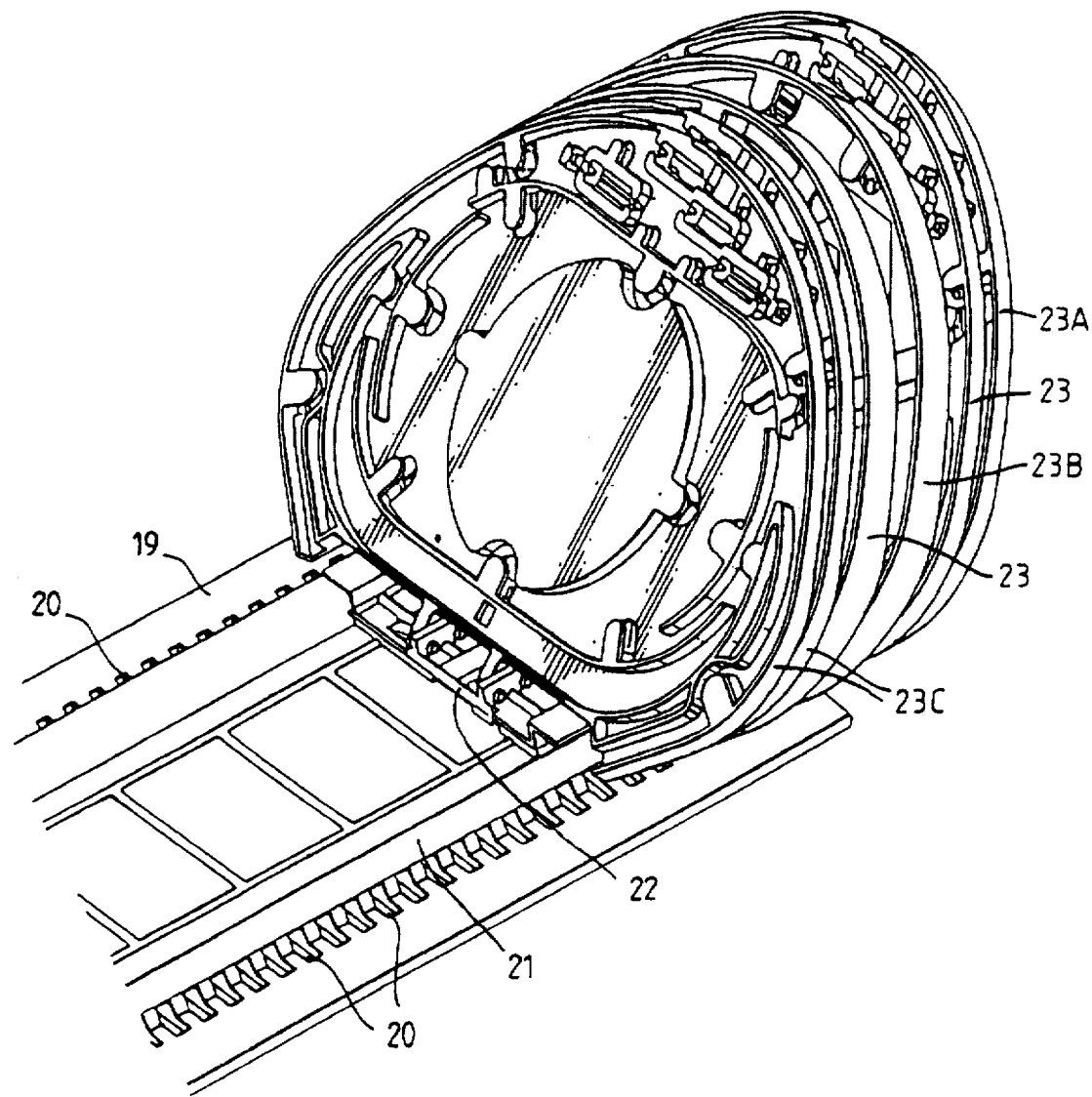
FIG. 4 shows a plate, means for location of trays, and a series of trays.

A plate, shown in FIGS. 4 and 5 may overlie the base and be retained by catches 18 which may snap through holes in the plate. The plate serves to maintain fibres in the guides whilst allowing their longitudinal movement, and also serves to secure the organizer trays into which the fibres will pass.

FIG. 4 shows the base 19 together with means 22 for locating optical fibre trays, and a series of such trays 23. Holes 20 can be seen in the plate 19 for receiving the snap fastenings 18 of the base shown in FIG. 3. These holes 20 may also serve as passages through which pass fibres leaving the base 7. We prefer, in fact, that the ramps 12 protrude slightly through these holes 20.

Fibres entering the base 7 along one of the passages 8, 9 therefore enter guides 10, 11, cross the base, pass up the ramps 12 through the holes 20 in the plate 19, and then enter the organizer trays 23.

Fibre entering an input tray 23A in this way is spliced to a further fibre which leaves that tray and passes to a splitter tray 23B where it may be spliced to a splitter, the outgoing fibres from the splitter then being directed to a series of further output trays 23C. A fibre entering one of these further trays is then spliced to an outgoing fibre which leaves that further tray through the hole 20 in the plate down the ramp, across a guide in the base and then leaves the base along the other of the passages 8, 9.

A preferred way in which fibres are routed between the various trays will be described below in connection with FIGS. 6 to 8. Nonetheless, it can be seen that organization of incoming and outgoing fibres (done by the base 7) has been separated from the fibre organization associated with splitters, splices and stored loops (done above the plate 19) thus the complicated and time consuming installation of splitters etc. can be done in the factory. All that needs to be done in the field is insertion of fibres along passages 8,9 through the guides 10,11 and into an input or output organizer tray 23A, 23C where it it spliced to pre-installed fibres that are already connected to a splitter tray.

Figure 5A:
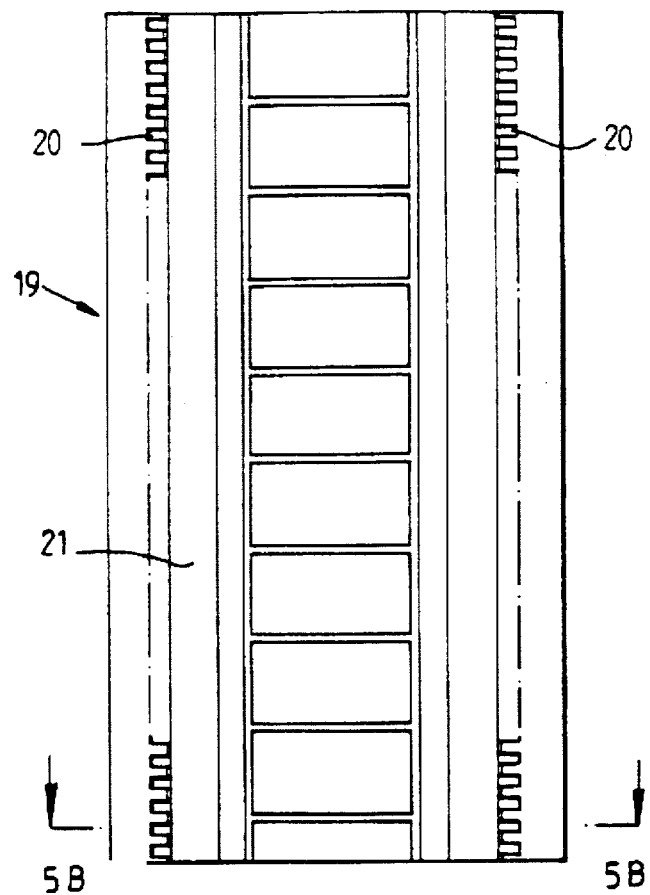
FIG. 5A to 5C shows the plate.
Figure 5B:
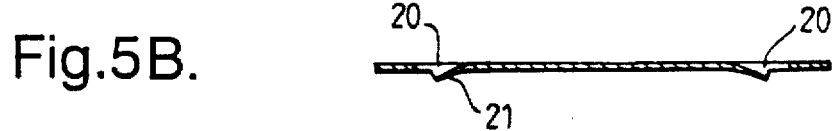
Figure 5C:
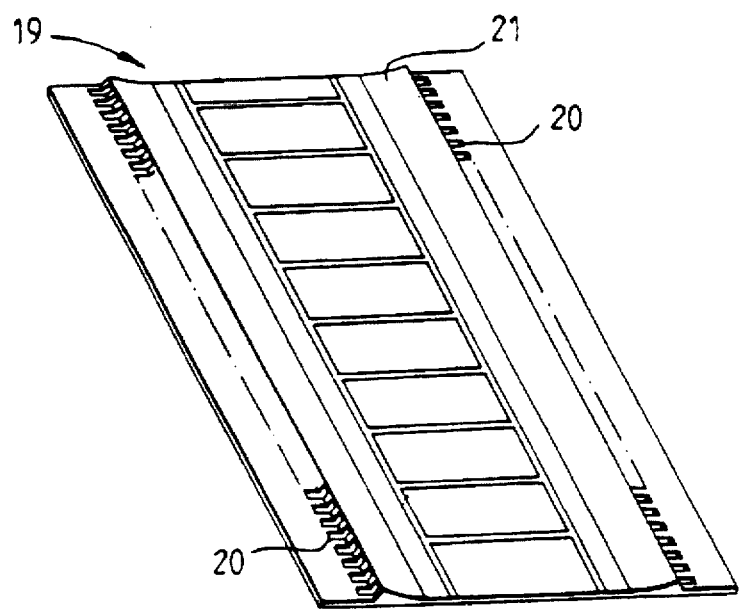

FIGS. 5A, 5B and 5C are respectively a plan view, an end elevation and a perspective view of the plate 19.

Figure 6:
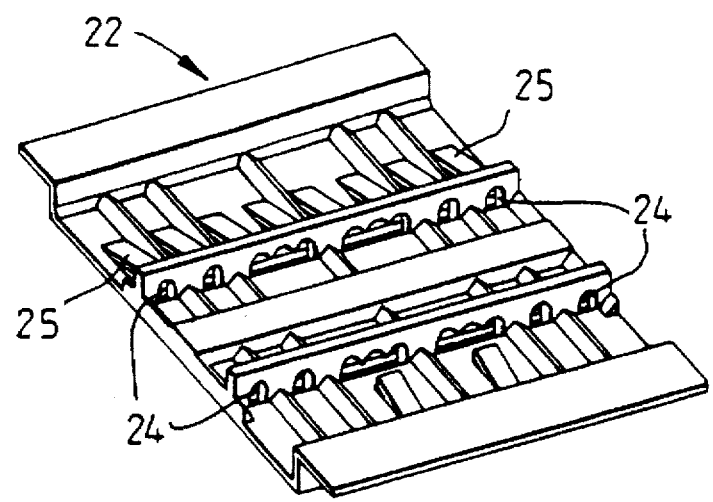
FIGS. 6, 7A, 7B and 8 show the means for location.
Figure 7A:
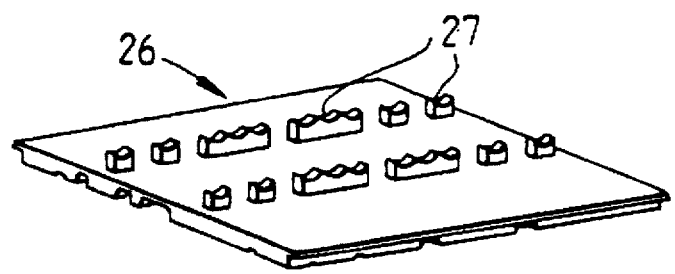
Figure 7B:
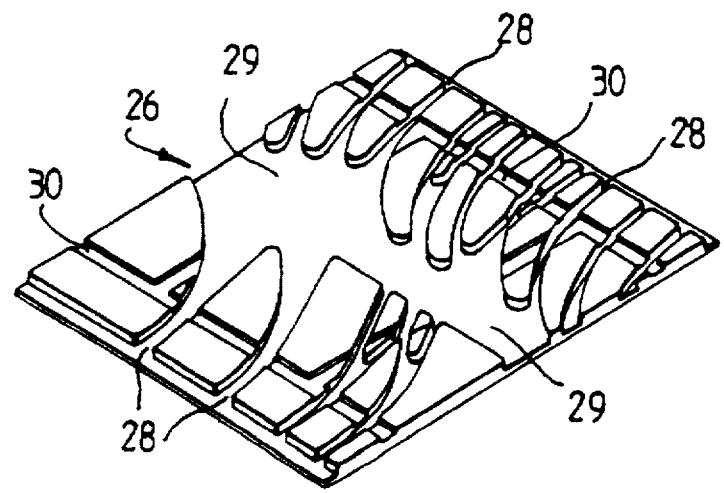
Figure 8:
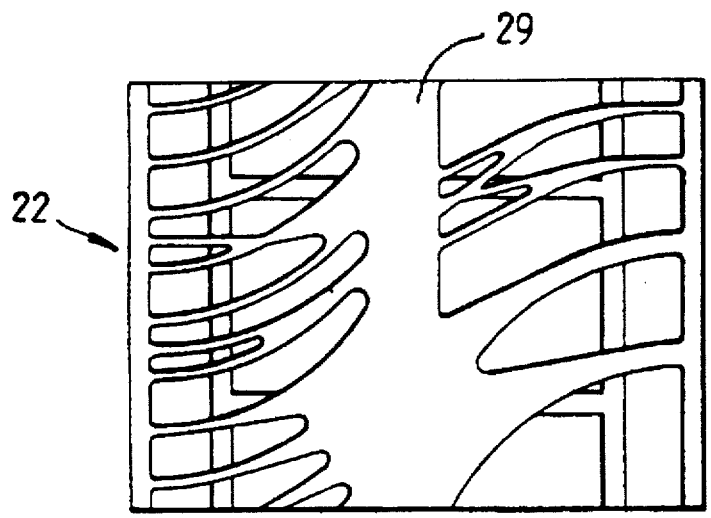
Figure 8:
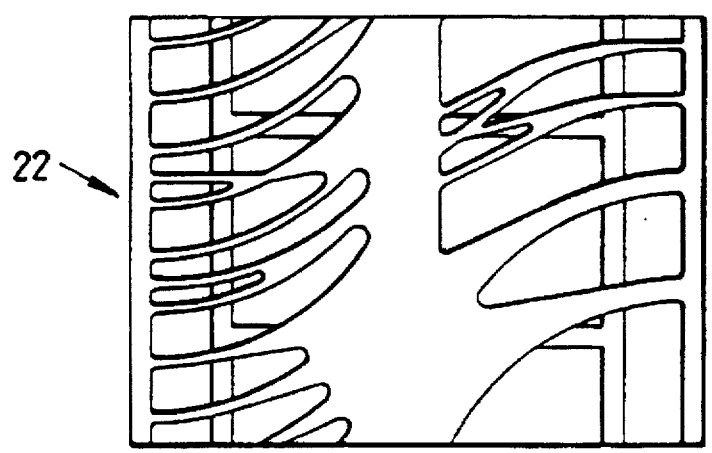
Figure 8:
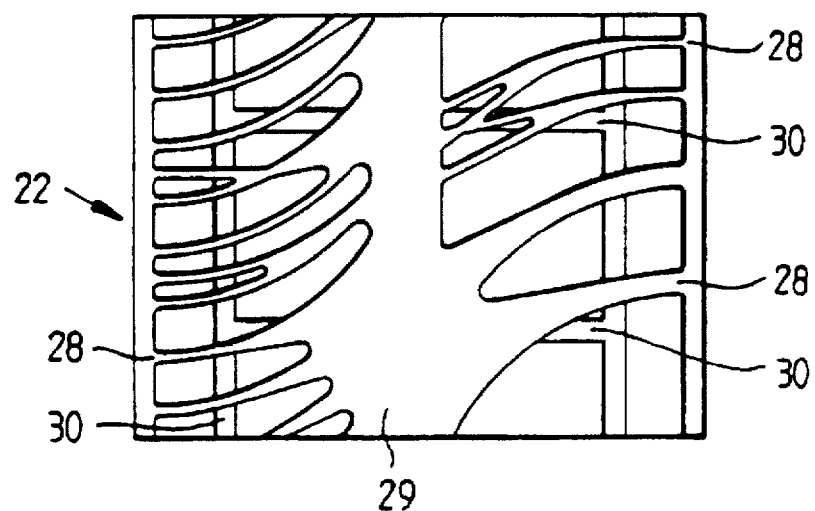

FIGS. 6 to 8 show means for locating organizers on such a plate. The means 22 has means 24 such as holes for receiving pivot pins of an optical fibre organizer tray. Such pivot pins may be carried by projections from the base of the tray, which projections snap behind catches 25 to prevent accidental removal of the trays. The means 22 may conveniently be manufactured by moulding in two parts, a top part being visible in FIG. 6, and a bottom part being shown in FIGS. 7A and 7B. The part shown in FIG. 7A carries supports 27 which protrude through holes in the base of the top part and which provide support for pivot pins of the organizer tray. The underside of the means 22 is shown in FIG. 7B, which illustrates the guides by means of which optical fibres pass from one tray to another. Means 22 may be bonded to the upper surface of the plate 19 (FIGS. 4 and 5). The top of the lands shown in FIG. 7B will contact and be bonded to the surface of the plate without damage to fibres lying in the guides 28 and 29. Preferably the fibres will be positioned in these guides before the bonding operation takes place. Fibres running from one organizer tray to another will pass across means 22 by entering a guide 28 on one side (lower left or top right sides as shown in FIG. 7B) and then leave through an opposite guide 28 after passing along the trunk guide 29 the requisite distance.

Several means 22 may be positioned on the plate end to end as shown in FIG. 8 where it can be seen that the pattern of guides repeats itself to allow interconnection between any two trays positioned along the plate.

In order to aid correct location of the means 22 on the plate and to confine adhesive to where it is required matching ridges and protuberances 30 may be provided on the means 22 and on the plate.

Figure 9A:
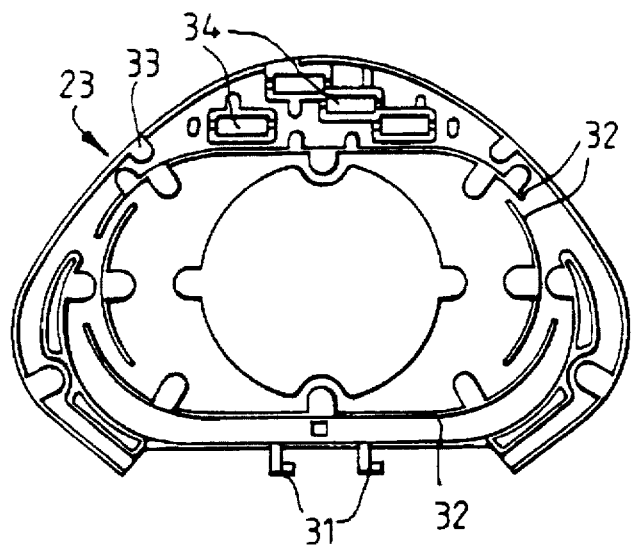
FIGS. 9A to C show organizer trays.
Figure 9B:
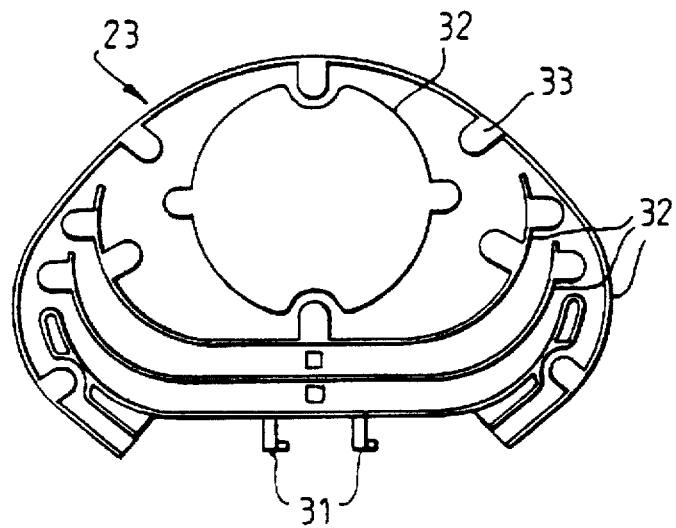
Figure 9C:
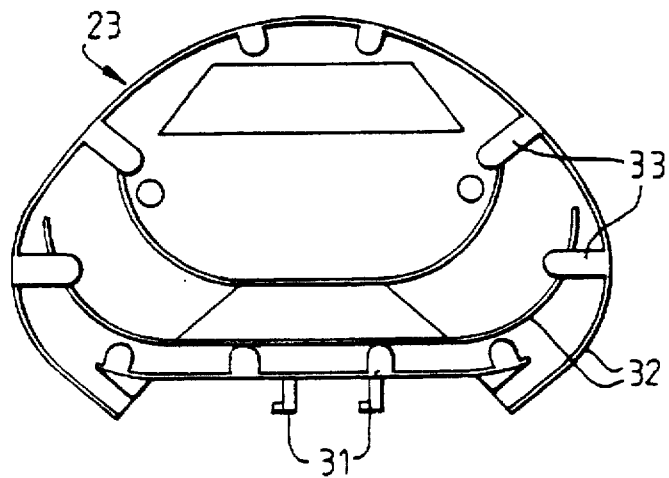

FIGS. 9A, 9B and 9C show various designs of optical fibre organizer trays. Pivot pins 31 carried by protrusions from the base of the organizer trays can be seen. Each tray has various curved walls 32 and catches 33 to retain fibre within the trays. Recesses or protrusions 34 may also be provided to locate fibre splices or fibre splitters.

Figure 10:
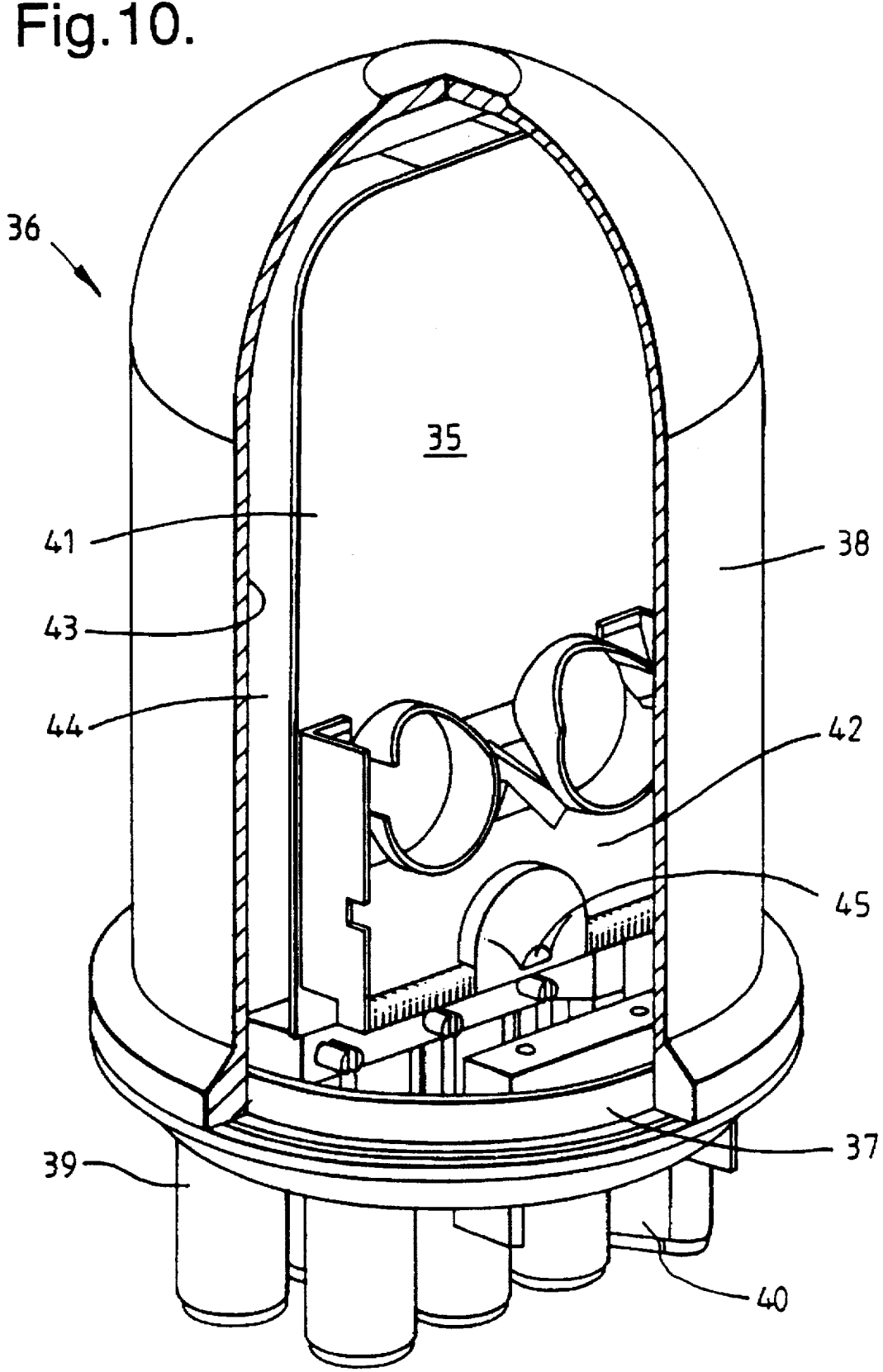
FIG. 10 shows an enclosure within which the components of the invention may be used.

FIG. 10 is a cut away drawing of a splice closure 36 which may accommodate and seal the various components of the invention. The closure comprises a base 37 and a dome-shaped cover 38. The base 37 carries various circular ports 39 and an oval port 40. Attached to a base is a frame or other support 41 to which a routing organizer 42 is attached. A second support or frame 43 is provided separated from frame or support 41 by a gap 44. This gap 44 may contain loops of fibre from incoming and outgoing cables that are not spliced within the enclosure and therefore by-pass the routing organizer 42.

The base 7 of the invention may be positioned in space 35 and its passages 8, 9 supplied by fibres leaving the routing organizer 42. A module of the invention, preferably pre-installed with fibres, may then be snap-fitted onto the base 7 and connections made to the fibres in the passages 8, 9 that have left the routing organizer 42.

A second routing organizer 42, and base and module of the invention, may be provided on the back of the frame or support 43, and therefore out of view. The two routing organizers 42 may then be in communication via through holes 45 so that fibres entering through any of the ports on the base 3 of the closure may pass to any of the organizer trays.

Cable is preferably supplied to the closure as follows. A loop of cable of approximately two metres length in inserted into the oval port 40. Some of the fibres constituting that loop will simply be stored in space 44, and others will be cut and fed to the routing organizer 42. That loop of cable may form part of a ring or spur in a fibre optic network. Fibres leaving the circular ports 39 after being spliced to or split from cut fibres of the loop may pass to subscribers or may be used to form a further spur. In a ring architecture a cable leaves main transmitting/receiving equipment at an exchange follows a ring and returns to back-up transmitting/receiving equipment at the exchange. The two ends resulting from cutting looped fibres in the enclosure therefore both go to the exchange and might both be needed to form a new spur or to go to subscribers. One end could be dealt with on frame 41 and the other on frame 43. Alternatively, send fibres could be dealt with on one frame and receive fibres on the other. The components of the invention allow for this flexibility.

For the avoidance of doubt it is noted that the invention provides various components, assemblies, systems and methods for organizing, storing and protecting optical fibres. Any of the various components disclosed may be used with any one or more other such components.

We claim:

1. A base for an optical fibre organizer, which comprises:
   a first passage along one longitudinal edge portion for incoming fibres;
   a second passage along an opposite longitudinal edge portion for outgoing fibres;
   a plurality of first fibre guides separated from one another along the length of the base and extending from the first passage across the base towards the second passage where fibres in said guides are directed away from the plane of the base;
   a plurality of second fibre guides separated from one another along the length of the base and extending from the second passage across the base towards the first passage where fibres in said guides are directed away from the plane of the base.

2. A base according to claim 1, in which each guide terminates in a ramp having a minimum bend radius at least equal to the critical bend radius of the fibre.

3. A base according to claim 1, in which the first and second guides are mutually interdigitated.

4. A base according to claim 3, in which the first and second guides are each defined by walls that separate the first guides from the second guides.

5. A base according to claim 3, in which the first guides curve along the base towards one end thereof, or the first guides curve along the base towards one end and the second guides curve along the base towards the opposite end, such that pairs of first and second guides direct fibres away from the plane of the base at substantially equal distances along the length of the base.

6. A base according to claim 1 in which the first and second guides curve into the first and second passages respectively at a minimum bend radius at least equal to the critical bend radius of the fibres.

7. A base according to claim 1 in which the first and second guides have means for retaining fibre tubes therein.

8. A base according to claim 1, which additionally comprises:
   a plate that can overlie the guides thereby preventing lateral displacement of fibres from the guides but allowing longitudinal movement of fibres into or out of the guides.

9. A base according to claim 8, in which the plate has passages therein through which can pass fibres directed away from the plane of the base by the first or second guides.

10. A base according to claim 8, in which the plate carries location means for location of one or more optical fibre organizer trays.

11. A base according to claim 1, having means for location of one or more optical fibre organizer trays.

12. A base according to claim 11, in which the means for location allows a plurality of trays to be pivotally secured adjacent one another.

13. A base according to claim 1 having third guides that can direct fibres from one side portion of the base at one longitudinal position to an opposite side portion of the base at any of a plurality of longitudinal positions.

14. An optical fibre organizer, which comprises:
   (1) a base according to claim 1;
   (2) location means for location of a plurality of optical fibre organizer trays separated from one another along the length of the base;
   (3) a plurality of optical fibre organizer trays so located by the location means; and
   (4) third guides that can direct fibres from one side portion of the base at a longitudinal position corresponding to that of one organizer tray to an opposite side portion of the base at any of a plurality of other longitudinal positions corresponding to those of other organizer trays.

15. An organizer according to claim 14, which additionally comprises:
   (5) a plate that can overlie the first and second guides thereby preventing lateral displacement of fibres from those guides, and on top of which the location means is located such that the third guides run between the plate and the location means.

16. An organizer according to claim 14, pre-installed with an optical fibre running from a first said organizer tray via one of said third guides to a second said organizer tray where it is spliced to another pre-installed optical fibre that runs from the second organizer tray to a third said organizer tray via another of said third guides.

17. An organizer according to claim 14, pre-installed with an optical fibre running from a first said organizer tray to an optical splitter, which optical splitter is attached to a plurality of other pre-installed optical fibres each of which runs from a second organizer tray to a respective one of a plurality of third said organizer trays via a respective other said third guide.

18. An optical fibre organizer module which comprises:
   (1) a plate;
   (2) location means overlying the plate for location of a plurality of optical fibre organizer trays separated from one another along the length of the plate;
   (3) a plurality of organizer trays so located by the location means; and
   (4) guides running between the plate and the location means that can direct fibres from one side portion of the plate at one longitudinal position corresponding to that of one organizer tray to an opposite side portion of the plate at any of a plurality of other longitudinal positions corresponding to those of other organizer trays.

19. A module according to claim 18, in which the plate has passages therein through which fibres passing underneath it and across its width can pass to the organizer trays located by the location means overlying it.

20. A module according to claim 19, in which the passages are curved at a minimum bend radius equal to at least the critical bend radius of the fibre.

21. A module according to claim 18, which is pre-installed with an optical fibre running from a first said organizer tray via one of said guides to a second said organizer tray where it is spliced to another pre-installed optical fibre that runs from the second organizer tray to a third said organizer tray via another of said guides.

* * * * *